(12) United States Patent
Beuschel et al.

(10) Patent No.: US 11,378,660 B2
(45) Date of Patent: Jul. 5, 2022

(54) LIDAR RECEIVING UNIT

(71) Applicant: Ibeo Automotive Systems GmbH, Hamburg (DE)

(72) Inventors: Ralf Beuschel, Wangen (DE); Michael Kiehn, Hamburg (DE)

(73) Assignee: Ibeo Automotive Systems GmbH, Hamburg (DE)

( * ) Notice: Subject to any disclaimer, the term of this patent is extended or adjusted under 35 U.S.C. 154(b) by 0 days.

(21) Appl. No.: 16/772,887

(22) PCT Filed: Nov. 16, 2018

(86) PCT No.: PCT/EP2018/081586
§ 371 (c)(1),
(2) Date: Jun. 15, 2020

(87) PCT Pub. No.: WO2019/115148
PCT Pub. Date: Jun. 20, 2019

(65) Prior Publication Data
US 2020/0309920 A1    Oct. 1, 2020

(30) Foreign Application Priority Data

Dec. 15, 2017  (DE) .................. 102017222971.3

(51) Int. Cl.
| | | |
|---|---|---|
| G01S 7/481 | (2006.01) | |
| G01S 17/42 | (2006.01) | |
| G01S 17/89 | (2020.01) | |
| G01S 7/4863 | (2020.01) | |

(52) U.S. Cl.
CPC ............ G01S 7/4816 (2013.01); G01S 7/481 (2013.01); G01S 7/4863 (2013.01); G01S 17/42 (2013.01); G01S 17/89 (2013.01)

(58) Field of Classification Search
CPC ...... G01S 7/4816; G01S 7/481; G01S 7/4863; G01S 17/42; G01S 17/89; G01S 7/487; G01S 7/486
See application file for complete search history.

(56) References Cited

U.S. PATENT DOCUMENTS

| | | | | |
|---|---|---|---|---|
| 10,481,269 B2* | 11/2019 | Pacala | ..................... | H01F 38/14 |
| 10,715,754 B2* | 7/2020 | Moore | ................. | G01S 7/4863 |
| 10,739,456 B2* | 8/2020 | Kubota | .................. | G01S 7/484 |
| 2012/0249998 A1 | 10/2012 | Eisele et al. | | |
| 2015/0177369 A1 | 6/2015 | Kostamovaara | | |

FOREIGN PATENT DOCUMENTS

| | | |
|---|---|---|
| DE | 10 2014 207 599 A1 | 10/2015 |
| EP | 2708913 A1 | 3/2014 |
| JP | 2014-59302 A | 4/2014 |
| JP | 2016-188808 A | 11/2016 |
| JP | 2017-111006 A | 6/2017 |
| WO | 2011/029645 A1 | 3/2011 |
| WO | 2017081294 A1 | 5/2017 |

* cited by examiner

Primary Examiner — Seung C Sohn
(74) Attorney, Agent, or Firm — Kelly & Kelley, LLP (57) ABSTRACT

LIDAR receiving unit in a focal plane array assembly, including a plurality of sensor elements arranged in macro cells and a plurality of readout elements, wherein at least two sensor elements are assigned to a macro cell, and each sensor element can be activated and deactivated individually or can be activated and deactivated in groups of sensor elements.

8 Claims, 7 Drawing Sheets

LIDAR RECEIVING UNIT

The invention relates to a LIDAR receiving unit.

A LIDAR measuring system is known from WO 2017 081 294. This LIDAR measuring system comprises a transmitting unit, a transmitting lens, a receiving lens and a receiving unit. One or more emitter elements of the transmitting unit emit a laser light, which is scattered in different spatial directions via the transmitting lens. The laser light is then reflected at an object and directed to the receiving unit via the receiving lens. The incident reflected laser light is detected by sensor elements. The advantage of this system is that it can be built in a compact manner and is static, in other words no movable adjustment elements are required for the emitter elements or the sensor elements.

The transmission space in which the transmitting unit emits the laser light is defined by the transmitting lens. This transmitting lens is also essentially identical to the receiving lens. The emitter elements and the sensor elements are arranged on a plane of the respective unit in the same spatial configuration. One sensor element is assigned to one emitter element, so that the resulting pair observes the same spatial angle via the respective lens. The distribution of the emitter elements and the sensor elements can be in the form of rows and columns, for example. In the optimum case, the laser light emitted by the emitter element and reflected at an object strikes the corresponding sensor element exactly. However, the laser light can be deflected, for example, due to imaging errors of the lenses used, so that only part of the surface of the sensor element is illuminated.

One object of the invention is therefore to provide a receiving unit that enables improved detection of incident laser light.

This object is achieved by a LIDAR receiving unit in accordance with claim 1. The dependent claims represent advantageous design variants of the invention.

A LIDAR receiving unit for a LIDAR measuring system is proposed. The LIDAR measuring system having the LIDAR receiving unit also achieves the above object. In particular, the LIDAR is designed for static, i.e. immobile arrangement on a motor vehicle. The basic features of the LIDAR receiving unit are designed according to the prior art. The LIDAR receiving unit comprises a plurality of sensor elements arranged in macro cells. Accordingly, the assignment is no longer, as in the prior art, one emitter element to one sensor element, but one emitter element to one macro cell, i.e. to a plurality of sensor elements. Thus, a macro cell on the receiving unit cannot be defined arbitrarily, but is essentially assigned to a defined spatial angle.

The LIDAR receiving unit is advantageously implemented in a focal plane array configuration. The sensor elements of the receiving unit are arranged essentially on the same plane, advantageously on a chip. The receiving unit is also arranged on the LIDAR measuring system at a focal point of a receiving lens. In particular, the sensor elements of the LIDAR receiver unit are arranged at the focal point of the receiving lens.

For example, a sensor element can be formed by a single-photon avalanche diode, hereafter also referred to as a SPAD. Such SPADs are a type of avalanche diode that trigger an avalanche effect on the arrival of a single photon and thus enable the detection of this photon. Such SPADs can be activated by applying a bias voltage. A corresponding lowering of the voltage causes the SPAD to be deactivated. As an alternative sensor element, a silicon photomultiplier, also known as an SiPM, can be used, for example.

The arrangement within a macro cell means the combination of the sensor elements into a larger complex. This complex or macro cell can be implemented in hardware or software, wherein the former is preferably in the form of a fixed piece of electrical circuitry. For example, this circuitry can be implemented on the chip on which the sensor elements are arranged.

In addition, the LIDAR receiver unit has a plurality of readout elements. A readout element is advantageously designed as a time-to-digital converter (TDC). This read-out element detects the triggering of the sensor element, or the SPAD, and passes this detection on to a storage element. The storage element preferably represents a histogram, which stores the triggering of the sensor element as a function of time. The time begins with the emission of a laser light by an emitter element and ends when the measuring cycle is completed. This allows a time-of-flight of the laser light and thus a distance to an object to be determined. The specific technical design of the readout element and storage element can be ignored in relation to the invention. What is ultimately important is that the sensor elements detect photons that are stored as a digital value within a histogram, the critical factor being the elapsed time since the laser light was emitted by the associated emitter element of the LIDAR measuring system.

It is particularly advantageous to use the TCSPC method, Time Corresponding Single Photon Counting, for the LIDAR measuring system. To detect an object and determine its distance, a measurement process is performed that comprises a plurality of such measuring cycles. Each measuring cycle fills the histogram, which is evaluated after the last measurement to determine objects and their distance away.

At least two sensor elements are assigned to a macro cell. The number of sensor elements of a macro cell is advantageously greater than two, in particular it is between two and forty sensor elements per macro cell.

The sensor elements can be activated and deactivated individually or in groups. This can be done, for example, by means of interconnection of the SPADs in hardware, which are connected to a control electronics, either individually or in groups. The first variant is preferred, according to which each sensor element of a macro cell can be individually activated. The group-wise activation is conveniently limited to a subset or the total number of sensor elements of a macro cell, which can then be activated and deactivated simultaneously. The macro cell can have one, two, three, four or more subsets of sensor elements.

The facility to activate or deactivate individual sensor elements or groups of sensor elements allows disruptive factors to be compensated. These can be the above-mentioned imaging errors of an optical system of the LIDAR measuring device. Accordingly, a poorly illuminated or unilluminated sensor element is deactivated. A well-illuminated or fully illuminated sensor element is activated accordingly. The same applies to groups of sensor elements. If necessary, on initial operation or at certain time intervals a configuration must be carried out, in which the relevant static sources of error can be compensated by the choice of the optimal sensor elements.

In particular, the measured values of the sensor elements of a macro cell are used to evaluate the same spatial angle. This is ultimately independent of whether the macro cell is assigned a single evaluation element or more than one, provided that the measurement data are used in the evaluation together with regard to the same spatial angle. As an example, different readout elements can be connected to the same storage element, which in particular represents a histogram.

A further advantage is a reduced signal-to-noise ratio or SNR. In particular, by disabling sensor elements that are not illuminated by laser light reduces background noise from incoming ambient radiation.

In particular, this is advantageous with regard to the architecture of an associated transmitting unit. This comprises a plurality of emitter elements, which are a relatively large distance apart on their chip. An associated receiving unit according to the prior art has sensor elements in the same spatial arrangement, wherein each sensor element has an identically spatially arranged emitter element as its counterpart. In the prior art technology, a space remains between the sensor elements, on which an incident laser light cannot be detected. Usually the emitter elements, which are designed as vertical cavity surface-emitting lasers VCSEL, for example, have a larger diameter than the sensor elements, for example SPADs. Accordingly, the laser diameter can be larger than the surface area of a SPAD. It is therefore practical to implement a plurality of SPADs on the receiving unit, so that more than one of the adjacent SPADs are illuminated at the same time. Accordingly, a large number of sensor elements per emitter element is advantageously formed on the receiving unit, which according to the previous and also subsequent embodiments, interact to form macro cells.

In the following, the advantageous variants of the invention are explained in more detail.

It is proposed that a sensor element is connected to only one readout element. On the other hand, a readout element can be connected to more than one sensor elements, in particular also to more than one sensor element of the same macro cell and/or of different macro cells.

An incoming photon, detected by the sensor element, is therefore stored in the histogram only once. In addition, a readout element can be operated by several sensor elements, which provides a cost-effective and space-optimized architecture. Only one active sensor element can be read out by the readout element, so that a deactivated sensor element connected to the same readout element does not affect a measurement. Finally, all sensor elements that are connected to the same readout unit are read out simultaneously, but only one active sensor element can detect a photon.

Advantageously, the sensor elements of a first macro cell are connected to at least one first readout element and the sensor elements of a second macro cell are connected to a second readout element.

This enables a separate evaluation of the individual spatial angles with regard to the incoming laser pulses. The above-mentioned advantages can also be achieved by activating the illuminated sensor elements and deactivating the unilluminated sensor elements. In addition to the compensation of imaging errors, other methods can also be applied, which provide other advantageous effects. However, these are not described in this specification.

Each of the sensor elements of the macro cell can be connected to the same readout element. However, each sensor element of the macro cell can also be connected to a separate readout element. Or two or more subsets of sensor elements of a macro cell can each be connected to the same readout element. Each subset is therefore connected to a different readout element. In the first case, the macro cell is assigned one readout element, in the second and third case, the macro cell is assigned a plurality of readout elements. However, these three design variants do not exclude the possibility that further sensor elements from other macro cells, such as a third macro cell, could be connected to a readout element that is already connected to one or more sensor elements of the first macro cell. Each of the three variants referred to in this section is compatible with the statements made in the following paragraphs.

A macro cell is active when at least one sensor element of the macro cell is activated. A LIDAR measuring system usually scans its environment, so that not all macro cells of the receiving unit are active at the same time. Instead, the macro cells, in particular groups of macro cells, are activated and deactivated one after the other. In a simple example, with a rectangular array pattern of emitter elements and sensor elements a horizontal scan is carried out by scanning over, i.e. activating and deactivating, the emitter elements and sensor elements one by one. This is also called a scanning method. In particular, this enables an improved directional resolution to be achieved because only those sensor elements or macro cells of the spatial angles which should also be illuminated are active.

The emitter elements emit a laser light at the beginning of the measuring cycle and the relevant sensor elements are active for the duration of the measuring cycle. A readout element can therefore read out sensor elements of different macro cells to which it is connected. This readout element is preferably only connected to sensor elements of a macro cell, the macro cells of which are not active at the same time during the scanning process. For example, in this simple example, sensor elements located in the same row may be connected to the same read-out element for this row. Finally, the sequence of the scanning process is already partly determined by the architecture of sensor elements and readout elements, or the type of scanning must be observed when designing the architecture of the receiving unit.

A sensor element of an active macro cell and a sensor element of another macro cell that is active at the same time are connected to different readout elements, or not connected to the same readout element. In other words, the sensor elements of a first active macro cell are connected to at least one first readout element and the sensor elements of a second measuring cell, active at the same time, are connected to at least one second readout element, and so on for further active measuring cells. The same time in this case means within the same measuring cycle. A sensor element of an active macro cell and a sensor element of a macro cell that is not active at the same time can be connected to the same readout element, in order to share this readout element. This allows the same readout element to be used for macro cells that are active consecutively. The statements in this section should of course also be read with regard to the previous statements, since in a macro cell a readout element can be assigned to each sensor element, a readout element can be assigned to a subgroup of sensor elements of the macro cell, or to all sensor elements of the macro cell.

It is proposed that a readout element is connected to a plurality of sensor elements of different macro cells, wherein these different macro cells are active during different measuring cycles or two of these macro cells are never active at the same time. At the same time meaning during the same measuring cycle.

In a particularly advantageous configuration, one readout element is connected to only one sensor element, to a plurality of sensor elements or to all sensor elements of a single active macro cell.

In line with the previous statements, however, this does not exclude the possibility that the readout element is also connected to other sensor elements of inactive macro cells.

The spatial arrangement of the sensor elements on the receiving unit is usually based on the spatial arrangement of the emitter elements on the transmitting unit. In the prior art, the spatial arrangement is essentially identical, wherein one emitter element and one sensor element are assigned to each other in each case. In relation to the prior art, the sensor elements on the improved receiving unit can essentially be divided into two types of sensor elements. Accordingly, first sensor elements are formed on the receiving unit, which correspond to the configuration of the sensor elements according to the prior art. For example, this can be one or a multiplicity of sensor elements that correspond to the spatial position of the emitter elements. The other sensor elements are second sensor elements, which are arranged in the spaces between the first sensor elements. Advantageously, these are arranged around the first sensor elements in order to compensate for any deflection of the laser light by selective activation and deactivation of the sensor elements. The sensor elements are arranged on a plane, which is normally provided by a chip. However, the sensor elements cover only part of the surface of the chip. In particular, distances must be maintained between the adjacent sensor elements for both functional and production reasons. In addition, space must be kept free on the chip for the circuitry or other components, for example for the readout element. The laser light, which is typically circular or elliptical, usually covers a larger area on the chip than a sensor element, in particular a SPAD, so that several sensor elements are usually illuminated by the incident laser light. A VSCEL as the emitter element also already has a larger surface area than a SPAD. This arrangement therefore allows a significantly better utilization of the incident laser light for detection and further reduction of the ambient radiation.

As already mentioned, advantageously only the illuminated sensor elements are activated, because only a sensor element that is illuminated by the laser light can contribute meaningful measurement data. A sensor element which is not illuminated by the incident laser light of the emitter element measures only ambient radiation and thus degrades the signal-to-noise ratio. Advantageously, illuminated sensor elements have an illumination area of at least 50%. The laser light advantageously covers at least 50% of the surface area of the sensor element. The exclusive activation of sensor elements that are sufficiently illuminated thus improves the signal-to-noise ratio.

It is further proposed that the sensor elements and/or the macro cells are arranged in a square, rectangular, diagonal or hexagonal pattern.

The following statements apply equally to both the sensor elements and the macro cells. The rectangular pattern essentially corresponds to the arrangement of the sensor elements in columns and rows, the arrangement in a square pattern being a special case of the rectangular pattern. Another arrangement variant is the hexagonal pattern, which provides the greatest density of sensor elements for a substantially circular laser spot. The advantage of rectangular or square patterns is that a large number of sensor elements are struck or illuminated by the incident laser light. However, a rectangular or square pattern usually requires a large laser light diameter. When a hexagonal pattern is used the number of illuminated sensor elements is smaller, being reduced from four to three illuminated sensor elements, for example. However, the illumination of the three sensor elements is achieved with even a reduced diameter of the laser light. In addition, in the case of a hexagonal pattern, for a constant laser light diameter the average illumination area of the sensor elements which are struck is larger than for a square or rectangular pattern. This is due to the higher filling factor at the sensor surface inherent in the hexagonal pattern compared to a rectangular or square pattern. A diagonal pattern corresponds to a particular shape of the rectangular pattern. The diagonal pattern has a freely selectable angle by which the lines are tilted. In addition, adjacent rows can have a line-shaped offset which either continues identically or varies from row to row.

It is particularly advantageous if the diameter of the incident laser light is conveniently at least twice as large as the distance between two sensor elements, in particular SPADs. The distance is defined as the distance between the centre points of the sensor elements.

In a further advantageous design variant, adjacent sensor elements have a spacing of between 5 and 15 microns, in particular ten microns.

For example, a typical distance between the emitter elements in a transmitting unit is 40 µm. Between the first sensor elements, therefore, there is space for additional second sensor elements. Accordingly, at a distance of approximately 10 µm, roughly three additional sensor elements can be added, for example in the form of rows. In this case, a macro cell would contain 4 rows of sensor elements.

A further LIDAR receiving unit for a LIDAR measuring system according to claim 6 is also proposed, which also achieves the object. The statements in the preceding paragraphs also apply correspondingly to the LIDAR receiver unit described in more detail below. Likewise, the following statements are also not limited to the preceding embodiments. Accordingly, the following statements can also be applied to the receiver unit described above.

The LIDAR transmitting unit of the LIDAR measuring system has a plurality of emitter elements in the form of lasers. The emitted laser light of the emitter elements is reflected by an object and detected by the LIDAR receiving unit of the LIDAR measuring system. The receiving unit comprises a plurality of sensor elements. These sensor elements can be designed according to the previous embodiments. However, no restriction to the previous embodiments is intended.

The number of sensor elements of the receiving unit is greater than the number of the emitter elements of the transmitting unit. This has already been explained above using first and second sensor elements. This results in the advantages already described, such as the possibility of compensating for the imaging errors of the transmitting and receiving lenses used.

The receiving unit is advantageously implemented in a focal plane array arrangement. Accordingly, the sensor elements are arranged in a plane. The measuring system advantageously has a receiving lens and a transmitting lens. The receiving lens and the transmitting lens assign the respective spatial angles to the respective emitter elements and sensor elements. The sensor elements can be arranged on the receiving unit in the form of the rectangular, square, diagonal or hexagonal pattern already described. The arrangement of the sensor elements in macro cells according to the previous embodiments is also applicable here.

In particular, at least two sensor elements on the receiving unit are assigned to a macro cell, wherein the sensor elements of two macro cells, in particular two simultaneously active macro cells, are connected to different readout elements.

In principle, the LIDAR measuring system is also designed with an electronics unit, which performs control of the emitter elements, for example, control of the sensor elements and can also comprise control, readout, memory and evaluation elements. In particular, the electronics controls the correct synchronization of the elements and ensures the correct measurement operation of the measuring system. The electronics advantageously establishes a further connection to other components of a motor vehicle in order to transmit the data ascertained so that they can be further processed. In particular, this LIDAR receiving unit and this LIDAR measuring system are optimized for use in a motor vehicle.

It is further proposed that each sensor unit can be activated individually. It is also proposed that the sensor elements are implemented in macro cells according to at least one of the above embodiments.

The benefits have already been explained in detail above.

In addition, the number of sensor elements is advantageously an integer multiple of the number of emitter elements.

The use of a plurality of sensor elements in relation to the emitter elements provides a larger and also variably selectable detection area, which can be adapted to the incident laser light by selective activation and deactivation. The incident laser light is thus optimally detected at all times when the active sensor elements are correctly selected.

Particularly advantageously, the sensor elements are composed of first sensor elements and second sensor elements, wherein the first sensor elements essentially correspond to the spatial arrangement of the emitter elements of the transmitting unit and the second sensor elements being distributed around the first sensor elements. In particular, the second sensor elements are arranged between the first sensor elements. In particular, the second sensor elements are arranged in a circular pattern around the first sensor elements. For example, the circular arrangement can be formed by a hexagonal, rectangular or square pattern. The statements above in relation to claim 1 are also applicable correspondingly.

It is further proposed that the detector surface area covered by the sensor elements of a macro cell essentially corresponds to twice, three times or four times the area of the incident laser light or the area of an emitter element of the transmitting unit.

The area of the incident laser light is normally greater than, for example due to optical effects, or equal to the area of the emitter element, wherein the area of a sensor element is normally less than the area of the incident laser light and also less than the area of an emitter element. In addition, a space is formed between adjacent sensor elements due to both functional and production reasons, also known as an intermediate space. In the normal case the laser light incident on the receiving unit thus covers a plurality of sensor elements, including the intermediate spaces. The sensor elements are therefore selected in such a way that these, including their intermediate spaces, cover a multiple of the area of the incident laser light. The area covered by the sensor elements with intermediate elements is also known in the following as the detector surface. Particularly advantageously, the detector surface is at least four times as large, in particular five times as large, as the area of the incident laser projected onto the receiving element. The factor 4 essentially corresponds to the expected deviations of the incident laser light with respect to the first sensor elements. The detector surface is advantageously two to five times as large as the area of the incident laser light. The detector surface is advantageously formed by the sensor elements of a single macro cell.

In an advantageous way, the diameter of the detector surface of the sensor elements of a macro cell corresponds to at least twice the diameter of the laser light or the diameter of an emitter element.

For example, the laser light can also have an elliptical cross section. In addition, the emitter elements can also have a rectangular shape. In these cases, the diameter is defined by the longest straight path passing through the centre, or a diagonal.

The statements on the ratio of the surface areas between the detector surface and the area of the incident laser light or the area of the emitter element also apply here and should be incorporated mutatis mutandis.

A LIDAR receiving unit of a LIDAR measuring system according to claim 9 is also proposed, which also achieves the object.

The statements in the preceding paragraphs in relation to the LIDAR receiving unit and the LIDAR measuring system also apply accordingly to the LIDAR receiving unit described in more detail below. Likewise, the following statements are also not limited to the preceding embodiments.

Ultimately, all these different LIDAR receiving units represent different aspects of the same idea. The LIDAR receiving unit comprises a plurality of sensor elements. These can be designed according to the above descriptions. The sensor elements are sub-divided into first sensor elements and second sensor elements. The first sensor elements are arranged in a plane of the receiving unit, essentially in the same spatial configuration as the emitter elements of the transmitting unit.

The arrangement of the first and second sensor elements will now be described again in an easily understandable manner. The concept of the transmitting unit with its emitter elements is copied, which then forms the receiving unit. Accordingly, the emitter elements are replaced by sensor elements. These are the first sensor elements. The spatial configuration of the first sensor elements is similar to the spatial configuration of the emitter elements, but not necessarily identical to it. In particular, small offsets or displacements may occur. This can be due, for example, to the fact that the multiplicity of sensor elements and the arrangement in a hexagonal pattern for the receiving unit are facing a square or rectangular pattern of the transmitting unit. The number of the first sensor elements is therefore identical to the number of the emitter elements. The additional sensor elements, which represent the second sensor elements, are arranged in the free spaces between the first sensor elements or around the first sensor elements. This increases the possible surface area for detection by sensor elements and any image errors caused by lenses or other effects can be compensated.

The LIDAR transmitting unit of the LIDAR measuring system has a plurality of emitter elements in the form of lasers. The emitted laser light of the emitter elements is reflected by an object and detected by the LIDAR receiving unit of the LIDAR measuring system. The receiving unit comprises a plurality of sensor elements. These sensor elements can be designed according to the previous embodiments. However, no restriction to the previous embodiments is intended.

The number of sensor elements of the receiving unit in the form of first and second sensor elements is greater than the number of emitter elements of the transmitting unit.

The receiving unit is advantageously implemented in a focal plane array arrangement. Thus, the sensor elements are arranged in a plane. The measuring system advantageously has a receiving lens and a transmitting lens. The receiving lens and the transmitting lens assign the respective spatial angles to the respective emitter elements and sensor elements. The sensor elements can be arranged on the receiving unit in the form of the rectangular or square hexagonal patterns already described. The arrangement of the sensor elements in macro cells according to the previous embodiments is also applicable here.

In particular, at least two sensor elements on the receiving unit are assigned to a macro cell, wherein the sensor elements of two macro cells, in particular two simultaneously active macro cells, are connected to different readout elements.

In principle, the LIDAR measuring system is also designed with an electronics unit, which performs control of the emitter elements, for example, control of the sensor elements and can also comprise control, readout, memory and evaluation elements. In particular, the electronics controls the correct synchronization of the elements and ensures the correct measurement operation of the measuring system. The electronics advantageously establishes a further connection to other components of a motor vehicle in order to transmit the data ascertained so that they can be further processed. In particular, this LIDAR receiving unit and this LIDAR measuring system are optimized for use in a motor vehicle.

Each sensor element can advantageously be activated individually. Accordingly, the above statements for individual or group-wise activation and deactivation are applicable. In addition, the arrangement in a macro cell according to at least one of the above embodiments is particularly advantageous.

It is further proposed that the detector area covered by the sensor elements of a macro cell essentially corresponds to twice, three times or four times the area of the incident laser light or the area of an emitter element of the transmitting unit.

The area of the incident laser light is normally less than or equal to the area of the emitter element, wherein the area of a sensor element is again normally less than the area of the incident laser light and less than the area of the emitter elements. In addition, a gap is formed between adjacent sensor elements due to both functional and production reasons, also known as an intermediate space. In the normal case the laser light incident on the receiving unit thus covers a plurality of sensor elements, including the intermediate spaces. The sensor elements are therefore selected in such a way that these, including their intermediate spaces, cover a multiple of the area of the incident laser light. The area covered by the sensor elements with intermediate elements is also known in the following as the detector surface. Particularly advantageously, the detector surface is at least four times as large, in particular five times as large, as the area of the incident laser projected onto the receiving element. The factor 4 essentially corresponds to the expected deviations of the incident laser light with respect to the first sensor elements. The detector surface is advantageously two to five times as large as the area of the incident laser light. The detector surface is advantageously formed by the sensor elements of a single macro cell.

In an advantageous way, the diameter of the detector surface of the sensor elements of a macro cell corresponds to at least twice the diameter of the laser light or the diameter of an emitter element.

For example, the laser light can also have an elliptical cross section. In addition, the emitter elements can also have a rectangular shape. In these cases, the diameter is defined by the longest straight path passing through the centre, or a diagonal.

The statements on the ratio of the surface areas between the detector surface and the area of the incident laser light or the area of the emitter element also apply here and should be incorporated mutatis mutandis.

The first sensor element and the second sensor elements of a macro cell advantageously have a detector surface area that is at least double, triple or four times the area of the incident laser light of the corresponding emitter element of the transmitting unit.

Advantageously, a diameter of a detector surface of the first sensor element and the second sensor elements of a macro cell corresponds to at least twice the diameter of the incident laser light or the area of the corresponding emitter element of the transmitting unit.

In particular, at least two sensor elements on the receiving unit are assigned to a macro cell, wherein the sensor elements of two macro cells, in particular two simultaneously active macro cells, are connected to different readout elements.

It is further proposed that the macro cells are also arranged in rows and columns. Here also, a square, rectangular, diagonal or hexagonal arrangement is possible.

A macro cell can be spaced apart from an adjacent macro cell or may be arranged next to the adjacent macro cell without a space. A macro cell can have one neighbour spaced apart and one neighbour directly adjacent at the same time. In particular, all neighbours of a macro cell can be spaced apart or directly adjacent with no gap.

Advantageously, a gap is formed between macro cells in adjacent rows, wherein neighbours in adjacent columns are arranged without a gap. For example, groups of macro cells can also be formed, with the groups being spaced apart from each other but the macro cells in the group not being spaced apart from the adjacent macro cell. In one example, groups of two macro cells each can be formed on the sensor unit, wherein the groups adjacent to each other by row and by column do have a space between their macro cells.

Electronic components such as TDCs can be arranged in these intermediate spaces, for example.

Examples of the invention are explained once more in more detail using a number of design variants shown in the following figures. Shown are.

Figure 1:
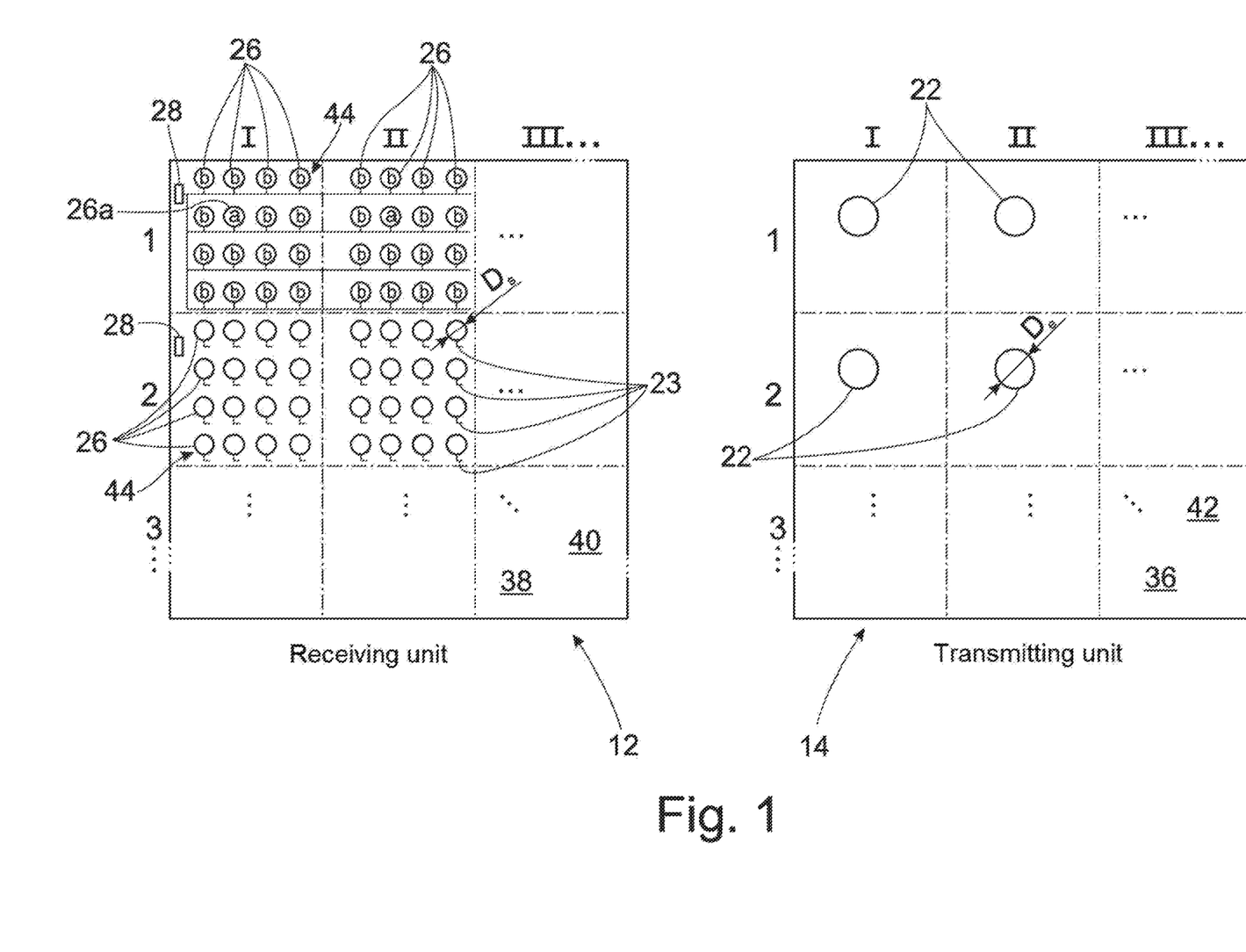
FIG. 1 a schematic drawing of a LIDAR receiving unit and a LIDAR transmitting unit.

FIG. 1 shows a LIDAR receiving unit 12 and a LIDAR transmitting unit 14 for a LIDAR measuring system 10. Such a receiving unit 12 and such a transmitting unit 14 are shown again in FIG. 2 inside the LIDAR measuring system 10. The LIDAR measuring system also comprises a receiving lens 16 and a transmitting lens 18. This LIDAR measuring system 10 is designed for static mounting on a motor vehicle in order to monitor an environment and to determine a distance from an object 20 to the motor vehicle. Such a measuring system can be used for autonomous driving, for example. The operating principle is as follows.

Figure 2:
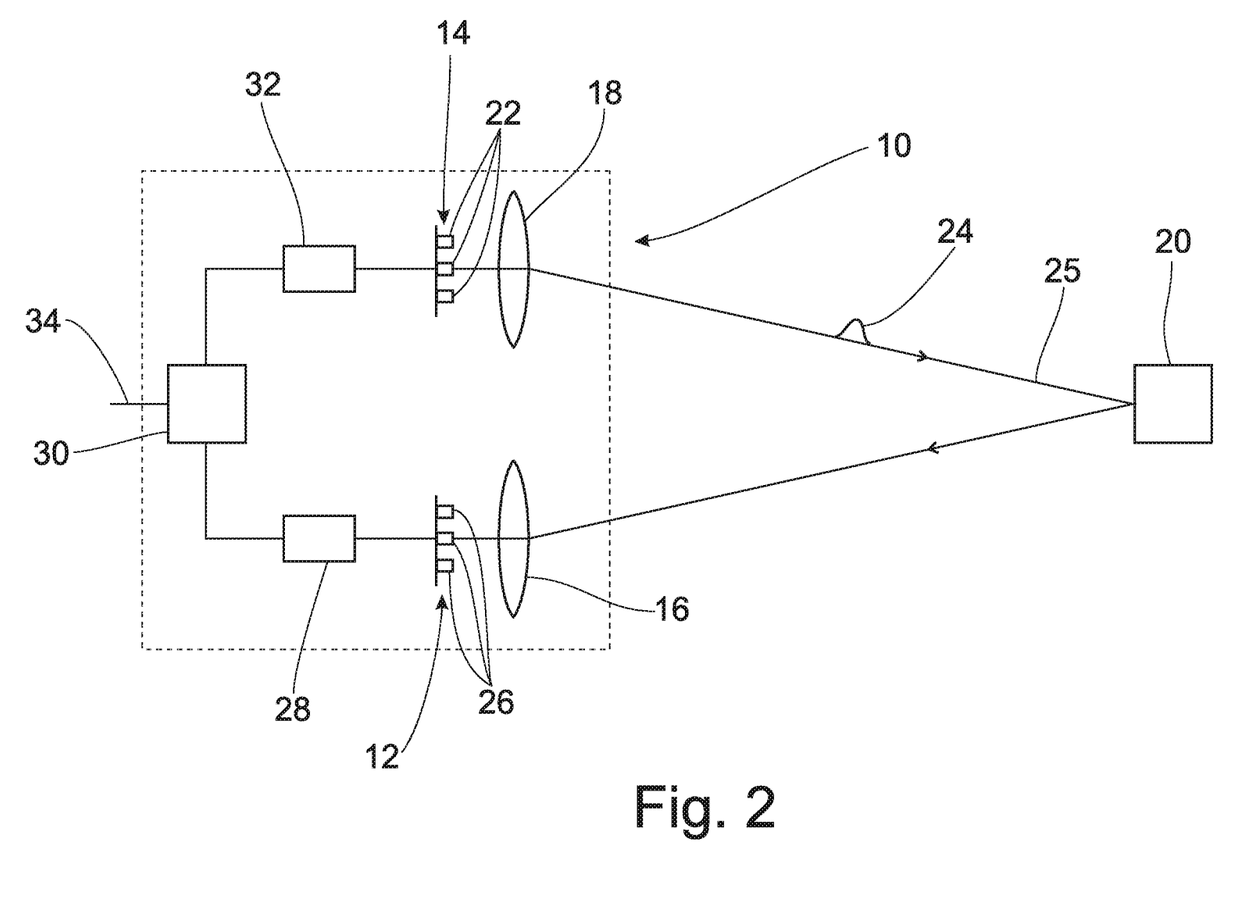
FIG. 2 a schematic design of a LIDAR measuring system.

The LIDAR transmitting unit 14 has emitter elements 22, which emit light pulses. For example, these emitter elements 22 can be formed by one or more vertical cavity surface-emitting lasers, abbreviated to VCSEL. A pulse 24 emitted by an emitter element 22 passes through the transmitting lens 18, is reflected at an object 20 and is directed via a receiving lens 16 on to one of a plurality of sensor elements 26. Such a sensor element can be formed, for example, by a single-photon avalanche diode, also known as SPAD.

In FIG. 2, to simplify the drawing only one beam 25 is shown, which is intended to illustrate the path of the pulse 24. With the aid of the lenses 16 and 18 and the plurality of emitter elements 22 and sensor elements 26, the measuring system 10 can be used to scan a space for objects. Due to the corresponding lenses 16 and 18, a specific spatial angle is ultimately assigned to each emitter element 22 and each sensor element 26. A light pulse 24 detected by a 26 is read out by a readout element 28 and forwarded to an evaluation unit 30, which has a storage element among other components. The time of flight principle, also called TOF, is used to determine the distance of the object 20 from the motor vehicle. The transmitted pulse is linked to the time elapsed until it arrives at the receiving unit 12, from which the distance travelled by the light pulse 24 can be determined. A corresponding coordination of the processes occurring is performed by the control unit 32. The readout element in this design variant is formed by a Time to Digital Converter, TDC, which fills a storage element that represents a histogram. However, these statements are very basic and are intended only to illustrate the general principle. This design variant by no means limits the electronic design of the measuring system. In order not to exceed the scope of this text, not all interactions between these electronic components and their specific structure can be presented. The LIDAR measuring system is connected to other components of the motor vehicle via a connection 34, via which the corresponding data can be transmitted.

FIG. 1 shows the structure of the transmitting unit 14 and the receiving unit again in more detail in a schematic drawing. The transmitting unit in this case has a plurality of emitter elements 22, which are implemented here as VCSELs. Only four emitter elements 22 are shown, although the chip can accommodate many times more emitter elements. The emitter elements are arranged in a rectangular pattern on the plane of the transmitting unit 14. This arrangement in columns and rows is selected as an example. For example, the arrangement can also be implemented on the plane in a hexagonal pattern or in any other form. The transmitting unit is implemented as a focal plane array. Accordingly, the emitter elements 22 are arranged on a plane 36, in this case on a chip 42 which forms the plane 36. The plane 36 of the LIDAR measuring system 10 is arranged at the focal point of the transmitting lens 18. In particular, the emitter elements 22 are arranged in the focal plane of the transmitting lens 18.

The receiving unit 12 has a plurality of sensor elements 26, wherein for the sake of clarity only some sensor elements 26 in the figure are labelled with reference signs. These transmitting elements, in this case SPADs 26, are also arranged in a plane 38 which is provided by the chip 40. This plane 38, in particular the sensor elements 26, is also arranged on the LIDAR measuring system 10 as a focal plane array in the focal plane of the receiving lens 16. The number of sensor elements 26 is substantially greater than the number of the emitter elements 22. In this design variant, an emitter element 22 has 16 sensor elements 26. A first sensor element 26*a* is assigned in each case to the spatial configuration of an emitter element 22 of the transmitting unit 14. In other words, the receiving unit 12 is a copy of the transmitting unit, with the emitter elements 22 replaced by first sensor elements 26*a*. Comparing the emitter elements with the sensor elements, it is apparent that the VCSELs are larger in diameter than the SPADs. The emitter elements 22 have a diameter De and the sensor elements 26 have a diameter Ds. Nevertheless, a gap is present on the transmitting unit between the adjacent emitter elements 22.

This gap is filled on the receiving unit 12 by additional sensor elements 26, which are referred to hereafter as second sensor elements 26*b*. The reference sign 26*b* is shown for clarity simply as "b" within the drawing of the sensor elements 26 and only for the topmost row. The reference signs of the first row accordingly represent the other rows and also columns. These second sensor elements 26*b* are arranged in the spaces between the first sensor elements 26*a*. The second sensor elements 26*b* are essentially arranged around the first sensor element 26*a*.

Figure 3:
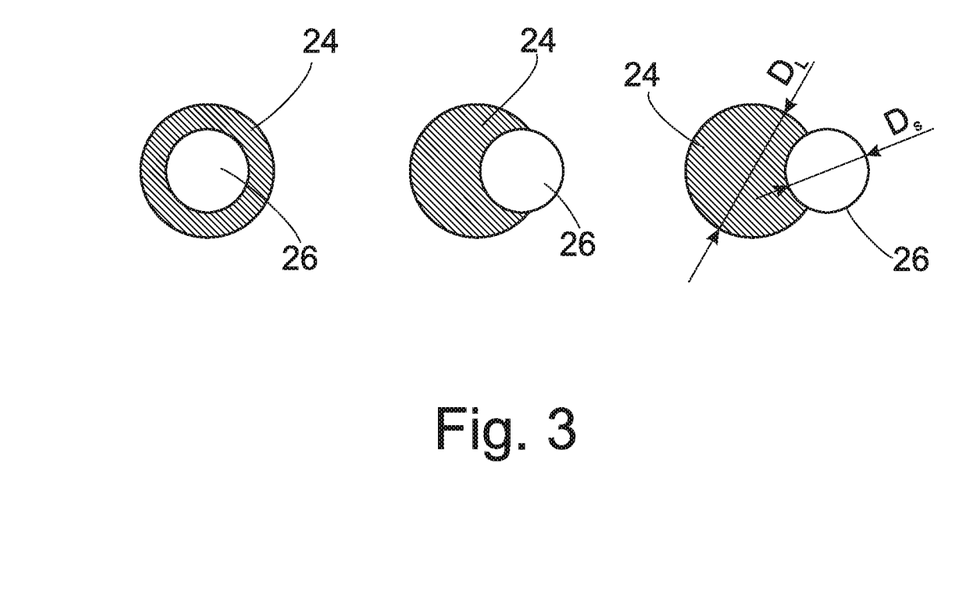
FIG. 3 different variants of the superposition of a laser light of an emitter element on a sensor element of a receiving unit.

By using a larger number of sensor elements 26 than the number of emitter elements 22, imaging errors in the lenses 16 and 18 or other effects can be compensated. An emitter element 22 has a larger surface area than a sensor element 26. This means that some of the sensor elements 26 on the receiving unit 12 are struck by an incident laser light completely, others only partially and others not at all. An example of this is shown for a single sensor element in FIG. 3. In the left-hand illustration, a complete overlap of the laser light 24 with the sensor element 26 is shown, in the middle drawing a partial overlap is shown and in the right-hand illustration a small overlap. The diameter DI of the laser light 24 relative to the area of the sensor element 26 is only shown schematically. Normally, the diameter DI of the laser light 24 is so large that even a multiplicity of sensor elements 26 can be covered with incident light.

The sensor elements 26 are arranged in macro cells 44. Each macro cell on the receiving unit 12 is demarcated from a spatially adjacent macro cell 44 by a dashed line. Each emitter element 22 is assigned to such a macro cell 44. As an example, the corresponding division is also illustrated by dashed lines on the transmitting unit 14. The macro cells are divided into columns by Roman numerals I, II, III, IV, V, etc. and into rows by Arabic numerals, 1, 2, 3, 4, 5, etc. A transmitting unit 14 and a receiving unit 12 can have more than 200 rows and columns.

Each macro cell has at least one first sensor element 26*a* and at least one second sensor element 26*b*. These sensor elements 26, which are grouped together in the macro cell, are connected to a readout element 28. The readout element detects an incoming photon at a sensor element 26 and forwards this to an evaluation unit, in particular to a storage unit. The remaining sequence in the processing of the detected photons is not explained here.

It is evident that the readout element is connected to all sensor elements 26 of the macro cell 44. The sensor elements can all be activated individually. This is effected by a bias voltage that can be applied to the SPAD. If the bias voltage exceeds a specific value, then the SPAD is active. A corresponding lowering below this value deactivates the SPAD. The voltage is specified by the control unit, which is connected to each of the SPADs. The interconnection is illustrated by conductors 23 by way of example. For the sake of clarity this is only implemented in row 2 of the receiving unit. Accordingly, only some of the reference signs 23 are drawn in FIG. 1. Each sensor element 26 can be activated and deactivated independently of the other sensor elements 26.

Thus, only the sensor elements 26 which are also illuminated by the laser light 24 are activated. This reduces background noise caused by the ambient radiation, because only the sensor element illuminated by the laser light 24 can provide meaningful measurements. In addition, by targeted selection of the active sensor elements 26, imaging errors in the lenses can be corrected. Moreover, other effects that cause a displacement of the laser beam 24 relative to the first sensor element 26*a* can also be compensated.

The sensor elements 26 can also be combined into groups for activation and deactivation, so that these groups can be activated and deactivated simultaneously. These can be, for example, subsets of sensor elements 26 of a macro cell 44 or all sensor elements 26 of a macro cell 44.

The readout element 28 on the receiving unit 12 in FIG. 1 is formed in each line of macro cells 44 and is connected to all sensor elements 26 of this particular line. This arrangement is only one example, however. In principle, each sensor element can have its own readout element. It is particularly advantageous if each line of sensor elements has one readout element. As an example, two adjacent rows can have a common readout element 28, wherein each sensor element 26 of the row is connected to this readout element 28. The sensor element 28 is also connected to a plurality of sensor elements 26 of different macro cells 44 of a row.

As an example, in this design of the receiving unit a horizontal scanning process is performed. Alternatively, vertical or diagonal scanning processes, in addition to other sequences such as rotating or even random scanning processes, are also possible. The emitter elements of column I emit a laser light 24 first and the desired sensor elements 26 of column I are activated simultaneously. The readout elements 28 can process incident laser light 24. On the completion of a measuring cycle, the sensor elements of column I are deactivated and the same operation begins for column II, etc. Since the readout unit 28 can only read out measurement data from activated sensor elements 26 or active macro cells 44, it is possible to use a single readout unit 28 for a plurality of consecutively active macro cells 44 or sensor elements 26. However, this arrangement and procedural description is only exemplary, and a wide range of arrangement options and scanning variants are possible for the receiving unit.

The sensor elements of the simultaneously active macro cells in a first measuring cycle for column I are connected to different readout elements 28 one macro cell at a time. Nevertheless, a simultaneous connection of sensor elements 26 to one readout element 28 exists in macro cells 44 which are not active at the same time, i.e. are in adjacent lines.

In FIG. 1 it is also apparent that essentially no space is formed between the sensor elements 26 of two vertically adjacent macro cells 44, while a space is formed between two horizontally adjacent macro cells 44. This spacing provides assembly space for the arrangement of additional electronic components. A space is formed between the sensor elements of column I and column II. No space is formed between the sensor elements of row 1 and row 2. The spacing of a macro cell is derived from the spacing of the sensor elements of these macro cells.

Figure 4A:
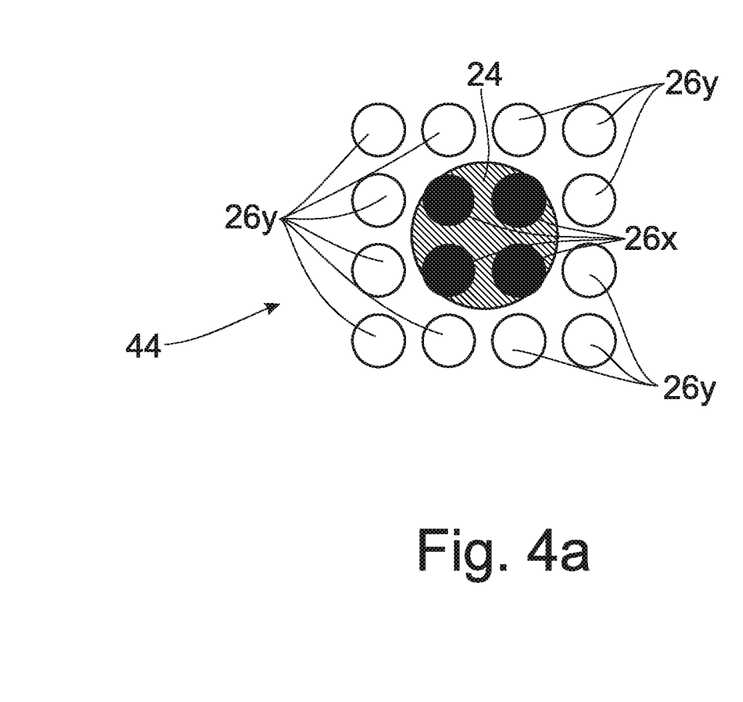
FIG. 4a, b a schematic drawing of the arrangement of sensor elements in a square pattern.

FIG. 4 shows a square arrangement of sensor elements 26 as an example. Here, the laser light in FIG. 4*a*, which is illustrated by the circle with the reference sign 24, strikes the centre of a macro cell 44. The laser light incident in a circular pattern has a diameter DI, so that in this case four circular sensor elements 26 are covered by the laser light. This represents the theoretical point of incidence of the laser light on the receiving unit 12 if the light is reflected on an object at infinity. The four dark hatched or filled sensor elements 26*x* are activated and the sensor elements 26 shown as unfilled circles 26*y* are deactivated. In contrast to the non-activated sensor elements 26*y*, the activated sensor elements 26*x* are almost completely covered with laser light, so that an optimal signal-to-noise ratio is achieved. If the deactivated sensor elements 26*y* were also activated, only the signal to noise ratios would deteriorate.

Figure 4B:
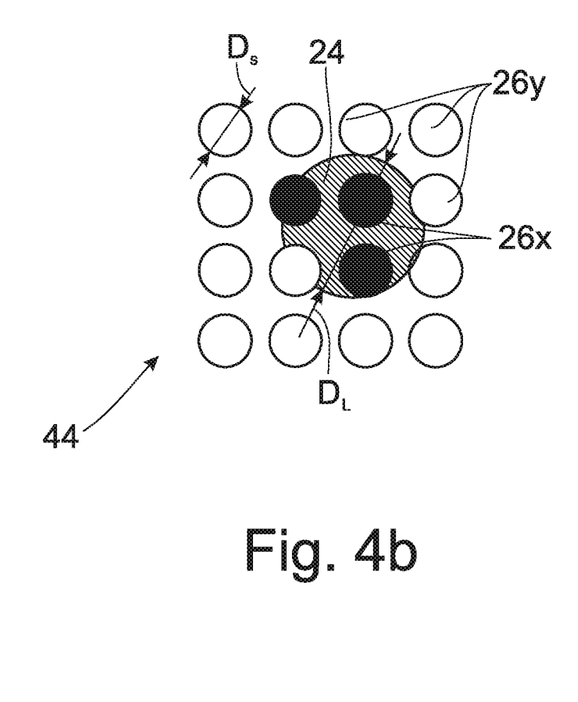

FIG. 4*b* shows the same configuration as in FIG. 4*a*. Due to an example imaging error in the receiving lens the laser light impinges on the receiving unit with an offset. The incident laser light 24 is thus displaced compared to FIG. 4*a*. Instead of the four illuminated sensor elements 26, only two sensor elements 26*x* are now illuminated fully and a third sensor element 26*x* at least to a large extent. One of the previously active sensor elements 26 has been deactivated to maintain an optimal signal-to-noise ratio. Any imaging errors of the lenses can differ from macro cell to macro cell and can be compensated by activating the correct sensor elements 26.

Figure 5A:
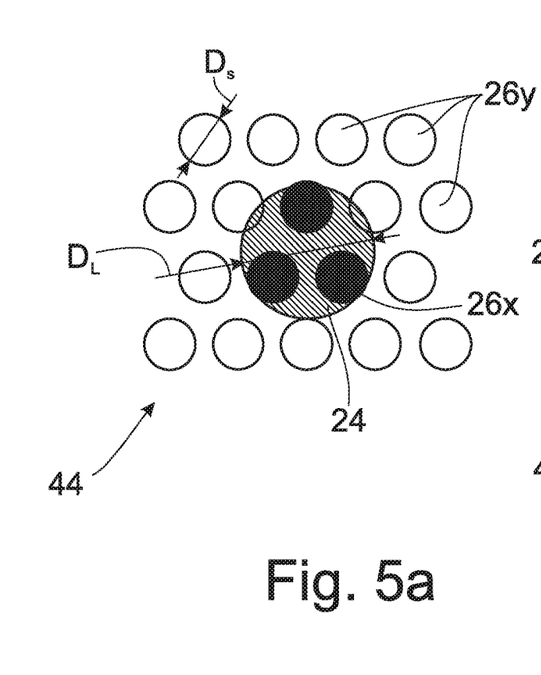
FIG. 5a, b, c a schematic drawing of an arrangement of sensor elements in a hexagonal pattern.
Figure 5B:
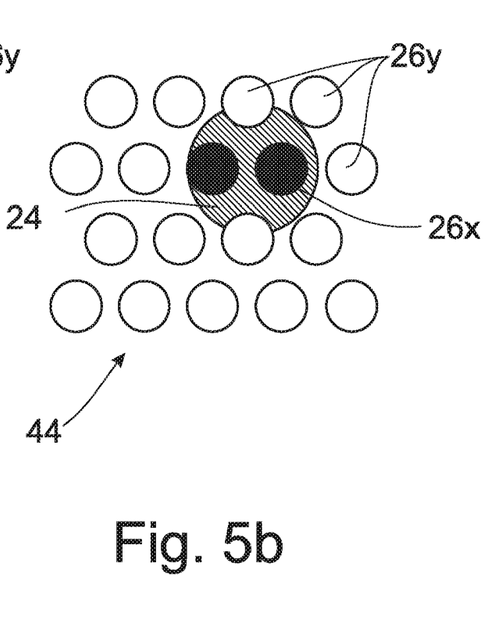

In another variant, shown in FIG. 5, a hexagonal pattern is used for the sensor elements 26. The hexagonal pattern or the hexagonal arrangement of the sensor elements 26 achieves a higher filling density, but on the other hand the number of active sensor elements 26*x* is reduced to 3. However, the diameter DI of the laser beam is already less than in the embodiments of FIG. 4. FIG. 5*a* shows the optimum, theoretically perfect illumination of three sensor elements, FIG. 5*b* shows a small displacement due to imaging errors so that one sensor element is fully illuminated and the other two active sensor elements are illuminated, at least to a large extent. FIG. 5*c* shows poor illumination in this system variant, in which two active sensor elements 26*x* are fully illuminated by the laser light 24 and two deactivated sensor elements are only approximately half-illuminated.

Figure 6:
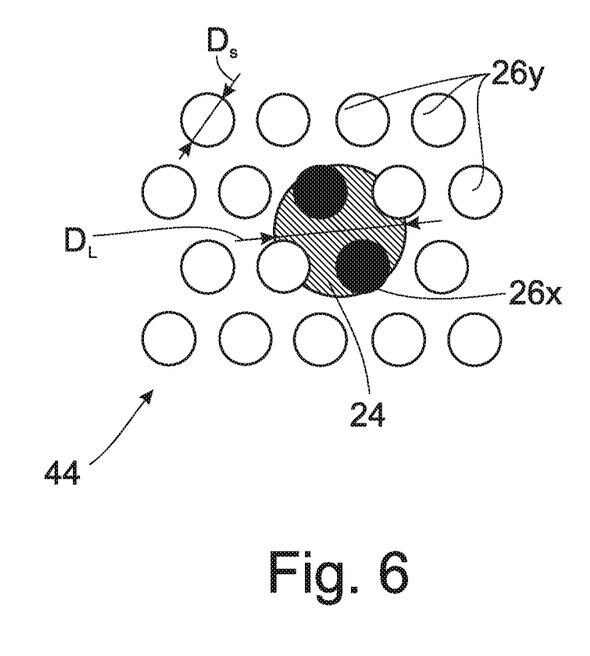
FIG. 6 a further schematic drawing of an arrangement of sensor elements in a hexagonal pattern.

In addition, FIG. 6 shows another variant with a hexagonal pattern, in which the laser of diameter DI of the laser light is reduced again compared to the embodiments in FIGS. 4 and 5. The result of this is that one or two of the sensor elements 26*x* is/are always sufficiently illuminated and therefore active.

Figure 7:
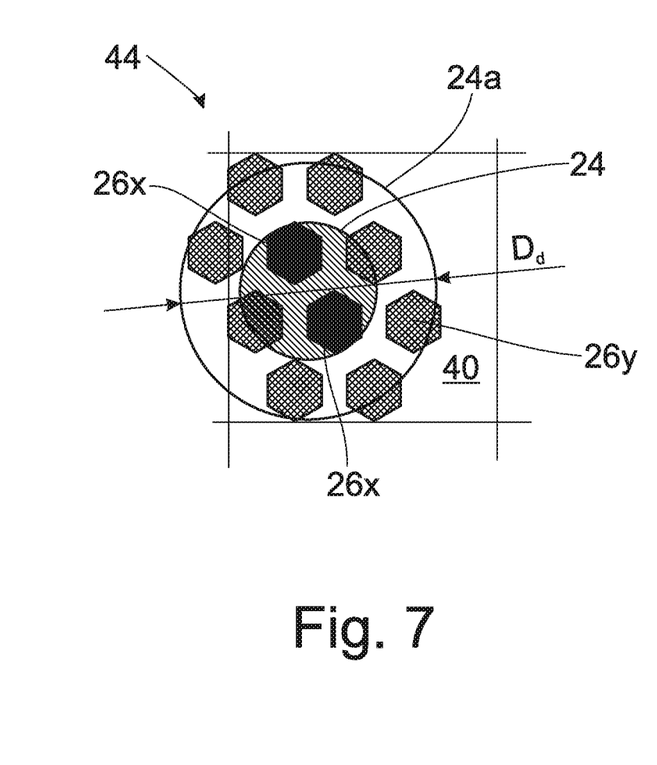
FIG. 7 arrangement of sensor elements on a chip in a hexagonal pattern.

FIG. 7 shows another practical example in a schematic representation with essentially hexagonally shaped sensor elements 26 arranged in a hexagonal pattern. In this case a chip 40 is shown with the sensor elements 26 and the incident laser light. In the optimal position of the incident laser light 24, two sensor elements 26*x* are activated and advantageously almost completely illuminated. A hypothetical maximum expected deviation of the laser light is indicated by the circle with reference sign 24*a*, within which the laser light can impinge on the macro cell 44. It is clear that the deactivated sensor elements 26*y* are arranged around the activated sensor elements 26*x*, the activated sensor elements 26*x* in this case being first sensor elements 26*a* and the deactivated sensor elements 26*y* being second sensor elements 26*b*. The sensor elements 26 and their intermediate spaces form a detector surface, thereby essentially covering the area of the laser light including a possible deflection due to interference effects. In this example, a diameter Dd of the detector surface corresponds essentially to twice the diameter DI of the laser light 24, wherein the detector surface is arranged centrally with respect to the optimal point of incidence of the laser light or centrally around the first sensor elements 26a. The area of the circle 24a, which also corresponds substantially to the detector surface, is about four times as large as the area of the laser light 24. The detector surface generally has a diameter Dd of at least 1.2, 1.4, 1.6, 1.8 or 2 times the diameter Dl of the laser light. Accordingly, the detector surface essentially has an area at least 1.5, 2, 3 or 4 times the area of the incident laser light.

Corresponding ratios for the areas and for the diameters also apply correspondingly to the previous exemplary embodiments, in particular to FIGS. 4 to 6.

Figure 8:
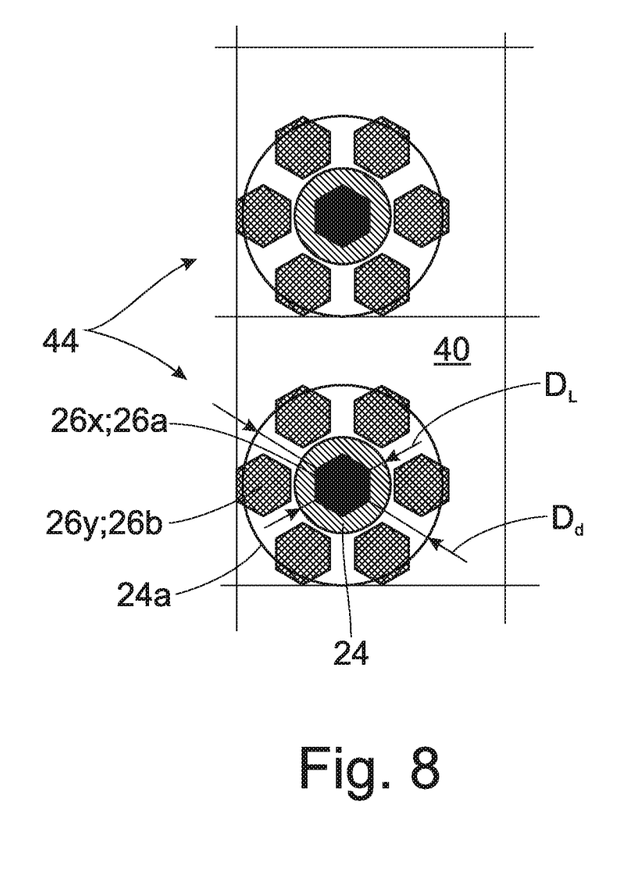
FIG. 8 a further arrangement of sensor elements on a chip in a hexagonal arrangement.

FIG. 8 again shows another variant, in which an even smaller laser beam is used compared to FIG. 7 and the arrangement of the sensor elements has a hexagonal shape. In this case, there is also a horizontal and a vertical gap between the sensor elements 26 of two macro cells 44 on the chip 40. This creates additional space for further electronics. The remainder of the design corresponds essentially to the above statements in the description of the figures.

The invention claimed is:

1. LIDAR receiving unit in a focal plane array assembly, comprising
   a plurality of sensor elements arranged in macro cells, and
      a plurality of readout elements, wherein the readout elements are designed as time-digital-converters, and wherein
   at least two sensor elements are assigned to a macro cell, wherein
   each sensor element can be individually activated and deactivated or can be activated and deactivated in groups of sensor elements, wherein each sensor element is connected to only one readout element, and wherein each readout element is connected to a plurality of sensor elements of different macro cells, wherein these different macro cells are active during different measurement cycles or two of these macro cells are never simultaneously active.

2. LIDAR receiving unit according to claim 1, wherein the sensor elements of a first macro cell are connected to at least one first readout element and the sensor elements of the second macro cell (44) are connected to at least one second readout element.

3. LIDAR receiving unit according to claim 1, wherein all sensor elements of a macro cell are connected to the same readout element.

4. LIDAR receiving unit according to claim 1, which detects laser light emitted by a LIDAR transmitting unit having a plurality of emitter elements in the form of lasers and reflected at an object, wherein the number of sensor elements of the receiving unit is greater than the number of emitter elements of the transmitting unit.

5. LIDAR receiving unit according to claim 4, wherein the detector surface covered by the sensor elements of a macro cell essentially corresponds to twice, three times or four times the surface area of the incident laser light or the surface area of an emitter element.

6. LIDAR receiving unit according to claim 4, wherein a diameter of a detector surface of the macro cell is at least twice as large as a laser light diameter or a diameter of an emitter element.

7. LIDAR receiving unit according to claim 1, which detects laser light emitted by a LIDAR transmitting unit having a plurality of emitter elements in the form of lasers and reflected at an object, comprising
   a. a plurality of sensor elements,
   b. wherein first sensor elements in a plane of the receiving unit have substantially the same spatial configuration as the emitter elements of the transmitting unit and
   c. second sensor elements are arranged in the intermediate spaces between the first sensor elements and/or are arranged around the first sensor elements.

8. LIDAR receiving unit according to claim 7, wherein a diameter of a detector surface of the first sensor element and the second sensor element of a macro cell is at least twice the diameter of the incident laser light or the area of the associated emitter element of the transmitting unit.

* * * * *